(12) United States Patent
Falempin

(10) Patent No.: US 10,895,221 B2
(45) Date of Patent: Jan. 19, 2021

(54) CONTINUOUS DETONATION WAVE ENGINE AND AIRCRAFT PROVIDED WITH SUCH AN ENGINE

(71) Applicant: MDBA FRANCE, Paris (FR)

(72) Inventor: Francois Falempin, Saint Arnoult (FR)

(73) Assignee: MBDA FRANCE, Paris (FR)

( * ) Notice: Subject to any disclaimer, the term of this patent is extended or adjusted under 35 U.S.C. 154(b) by 876 days.

(21) Appl. No.: 15/445,271

(22) Filed: Feb. 28, 2017

(65) Prior Publication Data
US 2017/0306888 A1 Oct. 26, 2017

Related U.S. Application Data

(63) Continuation of application No. 14/115,530, filed as application No. PCT/FR2012/000185 on May 9, 2012, now Pat. No. 9,599,065.

(30) Foreign Application Priority Data

May 16, 2011 (FR) ...................................... 11 01484

(51) Int. Cl.
| | | |
|---|---|---|
| *F23R 7/00* | (2006.01) | |
| *F02K 7/08* | (2006.01) | |
| *F02K 9/62* | (2006.01) | |
| *F23R 3/42* | (2006.01) | |
| *F02K 7/00* | (2006.01) | |

(52) U.S. Cl.
CPC .................. *F02K 7/08* (2013.01); *F02K 9/62* (2013.01); *F23R 3/425* (2013.01); *F23R 7/00* (2013.01); *F02K 7/00* (2013.01)

(58) Field of Classification Search
CPC ...... F02K 7/00; F02K 7/08; F02K 7/10; F02K 7/20; F02K 9/62; F23R 3/425; F23R 7/00
See application file for complete search history.

(56) References Cited

U.S. PATENT DOCUMENTS

| | | |
|---|---|---|
| 3,217,491 A | 11/1965 | Funk |
| 3,336,754 A | 8/1967 | Lange et al. |
| (Continued) | | |

FOREIGN PATENT DOCUMENTS

GB          1069217          5/1967

OTHER PUBLICATIONS

Nicholls, J. A. and Cullen, R. E., "The Feasibility of a Rotating Detonation Wave Rocket Motor," Final Report RPL-TDR-64-113, University of Michigan, Apr. 1964, pp. 1-310. (Year: 1964).*

(Continued)

*Primary Examiner* — Lorne E Meade
(74) *Attorney, Agent, or Firm* — Duane Morris LLP; Gregory M. Lefkowitz; Jason M. Nolan

(57) ABSTRACT

The invention relates to a continuous detonation wave engine and aircraft provided with such an engine. The continuous detonation wave engine (1) operates with a detonation mixture of fuel and oxidant and includes, in particular, a detonation chamber (3) comprising an injection base (10), the length of which is defined along an open line (17), such as to form a detonation chamber (3) having an elongate form in a transverse plane, as well as an injection system (4) arranged such as to inject the fuel/oxidant so mixture into the detonation chamber (3) at at least one segment of the injection base (10).

20 Claims, 4 Drawing Sheets

(56) References Cited

U.S. PATENT DOCUMENTS

| | | | |
|---|---|---|---|
| 3,516,253 | A | 6/1970 | Alllport et al. |
| 3,588,298 | A | 6/1971 | Edwards |
| 3,727,409 | A | 4/1973 | Kelley et al. |
| 4,741,154 | A | 5/1988 | Eidelman |
| 6,460,342 | B1 | 10/2002 | Nalim |
| 6,845,620 | B2 | 1/2005 | Nalim |
| 6,938,588 | B2 | 9/2005 | Jacobsen et al. |
| 7,251,928 | B2 | 8/2007 | Kojima et al. |
| 7,784,267 | B2 | 8/2010 | Tobita et al. |
| 7,905,084 | B2 | 3/2011 | Murrow et al. |
| 2005/0160737 | A1 | 7/2005 | Perlo et al. |
| 2010/0050592 | A1 | 3/2010 | Lu et al. |

OTHER PUBLICATIONS

Shepherd, J.E., "Pulse Detonation Engines: Initiation, Propagation, and Performance", Graduate Aeronautical Laboratories California Institute of Technology (GALCIT) Report FM2005.002, California Institute of Technology, Pasadena, CA, May 23, 2005, pp. 1-52.

Braun et al., "Air breathing Rotating Detonation Wave Engine Cycle Analysis", AIAA-2010-7039, 46th AIAA/ASME/SAE/ASEE Joint Propulsion Conference & Exhibit, Nashville, TN, Jul. 25-28, 2010, pp. 1-13.

Burr et al., "Fundamental Structure of High-Speed Reacting Flows: Detonation", 2014 AFOSR-ARO Basic Combustion Research Reviews, Arlington, VA, Jun. 2-5, 2014, pp. 1-33.

Burr et al., "Detonation Reignition within a Rotating Detonation Engine", AIAA-2016-1202, 54th AIAA Aerospace Sciences Meeting, San Diego, CA, Jan. 4-8, 2016, pp. 1-8.

F. Falempin: "Continuous Detonation Wave Engine" In: Advances on Propulsion Technology for High-Speed Aircraft, (Jan. 1, 2008), RTO, Neuilly-sur-Seine, France, XP002668632, vol. 8, p. 8-1 through 8-16.

Falempin, F., et al.: "R&T Effort on Pulsed and Continuous Detonation Wave Engines", 16th AIAA/DLR/DGLR International Space Planes and Hypersonic Systems and Technologies Conference 2009, 2009, pp. 1-15, XP002668633, American Institute of Aeronautics and Astronautic.

* cited by examiner

CONTINUOUS DETONATION WAVE ENGINE AND AIRCRAFT PROVIDED WITH SUCH AN ENGINE

This application is a continuation of U.S. patent application Ser. No. 14/115,530, filed Mar. 14, 2014, now U.S. Pat. No. 9,599,065, which is a 371 of PCT/FR12/00185, filed May 9, 2012, the disclosures of which are incorporated by reference herein in their entireties.

DESCRIPTION

The present invention relates to a continuous detonation wave engine operating with a detonating fuel/oxidant mixture, as well as to a flying craft that is provided with such an engine.

It is known that most propulsion systems that are used in the aeronautics and space field are based on a constant pressure thermodynamic combustion cycle.

It is also known that the use of a constant volume thermodynamic combustion cycle allows the theoretical performance of an engine to be substantially increased (by 15 to 25%). However, due to the displacement speeds of most aircraft, the realisation of constant volume combustion proves to be quite difficult and results in systems that are complex and difficult to implement.

The use of a thermodynamic detonation cycle can provide the same advantages in terms of energy efficiency. A detonation cycle is very similar to a constant volume cycle (the reaction occurs very quickly in a very low thickness of mixture that does not have enough time to dilate in order to limit the increase in pressure) and corresponds to thermodynamic efficiency that is even slightly better.

A Pulsed Detonation Engine (PDE) is known as a detonation engine, for which a tube, which is closed at one of its ends, is filled with a fresh fuel/oxidant mixture, and then a detonation is initiated in this fresh mixture. For the entire time that the detonation wave moves along the length of the tube, an overpressure exists on the closed end and momentarily creates a thrust. It is then necessary to wait for the discharge of the hot gases originating from the chemical reaction in the tube, and then for it to be refilled with a fresh mixture, before being able to initiate a new detonation wave and to obtain a new thrust pulse.

The pulsed nature of the thrust (operating between 50 and 200 Hz) generates a vibration environment that is very severe for the rest of the engine and, in addition, requires energy to be provided during each cycle in order to initiate the detonation, which can constitute a significant problem in terms of overall efficiency when the intention is to use low detonation fuel/oxidising agent pairings. These characteristics limit its use to highly specific applications (for example, in simple and inexpensive subsonic systems) or to highly complex systems associating a plurality of PDE type tubes.

In order to overcome the problem of the very severe vibration environment that is, a priori, generated by a pulsed detonation engine, the use of a Continuous Detonation Wave Engine (CDWE) is possible. In such a continuous detonation engine, a continuous production of hot gases originating from self-sustained detonation waves is generated in an annular chamber. A fuel/oxidant mixture is continuously injected at one of the ends of the annular chamber. A detonation wave is then initiated. This wave is circumferentially propagated in the fresh detonating mixture, whereas the hot gases that it produces expand into the rest of the annular chamber. As the injection of fresh mixture is continuous, when the wave returns to its start point it re-encounters fresh mixture and continues its circumferential movement, which thus becomes continuous.

An annular chamber is thus available in which a series of circumferential detonation waves, running at a frequency of several kHz (up to 30 kHz), produces hot gases that expand toward the open end of the chamber. There is therefore, as is the case for a constant pressure combustion chamber, a generator of hot gases that constitute, upon exiting the detonation chamber, a supersonic flow, the characteristics of which are so relatively uniform.

The advantage of this CDWE engine is that, in terms of the thermodynamic cycle, the detonation has the potential (as is the case for a PDE engine) for 15 to 25% greater efficiency than that of constant pressure combustion. Furthermore, its operating principle prevents the generation of a very severe vibration environment, as is the case for a pulsed detonation engine (PDE).

Nevertheless, the applications of this CDWE continuous detonation engine are limited by the use of a closed, generally annular shape for the detonation chamber. This annular chamber comprises, at the upstream end, a transverse surface (referred to as injection base hereafter) that represents a ring shape, that is to say its width is constant and its length is defined by a general line forming a closed curve, generally a closed circle. However, the maximum performance levels can only be achieved within a relatively narrow range of local operating conditions (in particular richness of the fuel/oxidising agent mixture). Therefore, it is difficult to design an annular chamber operating within a very broad field of use whilst complying with the conditions that are required to obtain satisfactory energy efficiency at all points of this chamber.

The object of the present invention is to improve the aforementioned continuous detonation engine, in particular by overcoming these disadvantages.

To this end, according to the invention, said continuous detonation wave engine, which operates with a detonating fuel/oxidant mixture and which comprises:
 at least one detonation chamber;
 an injection system for continuously injecting the detonating mixture into said detonation chamber at an upstream end, said detonation chamber comprising an injection base at said upstream end, as well as two walls which extend on either side of this injection base; and
 initiation means which are disposed in said detonation chamber, to initiate in the detonating mixture a detonation wave which is then propagated in said mixture and is the cause of successive self-initiated detonation waves, so as to generate continuous production of hot gases, is noteworthy in that said detonation chamber comprises an injection base of which the length is defined by an open line, so as to form a detonation chamber having an elongate form in a transverse plane, and in that said injection system is disposed so as to inject the fuel/oxidant mixture into said detonation chamber at least one portion of said injection base. This injection system in particular is formed so as to generate (jointly with the wave initiated by the initiation means) specific local conditions that allow said series of detonation waves (naturally initiated) to be created in said detonation chamber.

In this way, by virtue of the invention, a continuous detonation wave engine is obtained that comprises a detonation chamber that does not have (and is not limited to) a (closed) annular shape and can have multiple other different (open) shapes, as specified hereafter.

This detonation chamber comprises an elongate upstream injection base, the length of which can be of any open, but not closed, shape, in particular straight or curved, as opposed to an annular chamber. This chamber further comprises two walls, which are preferably parallel, that extend on either side of this injection base. Said chamber thus has a three-dimensional geometric shape having faces (flat or non-flat) that meet at edges. Said chamber can, in particular, be in the shape of any type of hexahedron (polyhedron having six flat faces), and in particular a parallelepiped (hexahedron having parallel faces in pairs). In the case of a rectangular injection base that is thus defined by a straight line, the chamber can, for example, assume the general shape of a rectangular parallelepiped (all of the faces of which are rectangles).

By virtue of the multitude of shapes that can be contemplated for the detonation chamber according to the invention, the possible applications of said engine are increased considerably in relation to a conventional annular detonation chamber engine, and it is possible to overcome the aforementioned disadvantages, as specified hereafter.

It will be noted that, inside the detonation chamber, downstream of the initial detonation wave (that is initiated by the initiation means), there is a layer of fresh mixture (injected by the injection system) which, as it is in contact with the hot gases and under particular conditions that can be defined (in an empirical manner in particular), will give rise to a new self-initiated detonation wave. According to the invention, said series of successive detonation waves (self-initiated, that is to say naturally initiated) in the detonation chamber along the length of the injection base is thus obtained by virtue of the generation (by the preceding wave and the injection system) of local conditions allowing automatic initiation each time. Beyond the injection zone, along the length of the injection base, the detonation wave degenerates into a single compression wave.

Within the context of the present invention, the ends of the detonation chamber (at each end of the injection base) can be opened or closed, independently of each other, and the initiation (implemented by said initiation means) can be located anywhere along the length of the injection base of the chamber.

Due to the aforementioned specific features of the present invention, numerous applications can be contemplated, in particular for liquid propellant rocket engines, turbine engine systems or even ramjets.

In one specific embodiment, said injection system is capable of producing the injection over a variable length along the length of said injection base, which provides the following advantages:

a possibility of optimal operation over a wide range as regards requested thrust (for a ramjet application) or total richness (for a turbine engine application): a larger or smaller portion of the length of the chamber is supplied and the rest is only supplied by the oxidising agent (air, a priori); and a limitation of the start-up shock and a progressive increase in speed.

Furthermore, in this case, if two engines of this type are mounted on a flying craft so as to generate propulsions respectively on either side of an axis of rotation of said flying craft, a rotation of the flying craft about this axis can be generated from an asymmetric injection. By way of illustration, it is possible to mount such an engine on each wing of an aeroplane, the injection base being defined each time along the trailing edge of the corresponding wing, and create a yawing moment by carrying out different injections on these two engines. It is thus possible to create an aid for controlling the craft by asymmetric injection modulation.

In addition, the engine can advantageously comprise at least one cooling circuit for said detonation chamber, in which cooling circuit fuel can circulate before it is injected into said chamber. Preferably, said cooling circuit extends along at least one side wall of said detonation chamber, over at least a portion of its length.

In this way, the detonation chamber can be cooled using all or some of the fuel before injecting it into said chamber. This ensures the thermal resistance of the detonation chamber whilst vaporising at least some of the fuel to be injected as it circulates in said circuit. Direct injection of the pre-vaporised fuel ensures initiation and the stability of the detonation of the fuel-air detonating mixture. Problems associated with delays in the evaporation of the fuel droplets and chemical reaction are also prevented.

Furthermore, in one particular embodiment, said detonation chamber has a bifurcation at the injection base, allowing at least two elongate branches to be created beyond said bifurcation, each of which is supplied with detonating mixture by said injection system, which allows the creation of two propulsive lines by propagation of the waves in the two branches.

In this case, said injection system advantageously can be formed so as to supply each of these branches over a longer or shorter length and thus provide a possibility of controlling (vector thrust) the flying craft equipped with said engine.

Furthermore, in one particular embodiment, said engine comprises, in addition to said bifurcation chamber, an annular detonation chamber, and said bifurcation chamber is connected to said annular chamber so as to form a hybrid chamber. This particular embodiment thus combines the advantages of an annular chamber (ensured operating stability) and those of a bifurcation chamber:

optimal operation over a wide range of conditions (thrust/richness): a larger or smaller portion of the length of the chamber is supplied and the rest is only supplied by the oxidising agent (air, a priori);

limitation of the start-up shock: only the annular chamber is started; and distributed propulsion (and distributed control).

Furthermore, in one particular embodiment, said hybrid chamber is in the form of an annular detonation chamber that is provided with concentric extensions (or branches) of variable feed lengths. These concentric extensions can be disposed inside said annular detonation chamber or outside said annular detonation chamber. It is then easy to modulate the thrust in a continuous manner by supplying a longer or shorter length of the extensions with fuel (or fuel and oxidising agent for a rocket system). In the same way, it is easy to control the orientation of the thrust (for a ramjet or a rocket).

The present invention further relates to a propulsive system (for example, of the ramjet, turbine engine or rocket type) for a flying craft, that is provided with at least one continuous detonation wave engine, as previously described.

In one particular embodiment, this propulsive system is provided with at least two engines of this type, each of which comprises an injection system capable of modulating the injection. It is thus possible to generate an asymmetric injection modulation that can assist in the control of the flying craft.

The present invention further relates to a flying craft, in particular an aeroplane or a missile, that is provided with an engine and/or a propulsive system, as previously described.

The present invention can also be applied to an energy generation system that is installed on the ground, in particular a gas turbine, that is provided with at least one continuous detonation wave engine, as previously described.

The figures in the appended drawings provide an understanding of how the invention can be realised. In these figures, identical reference numerals designate similar elements.

Figure 1:
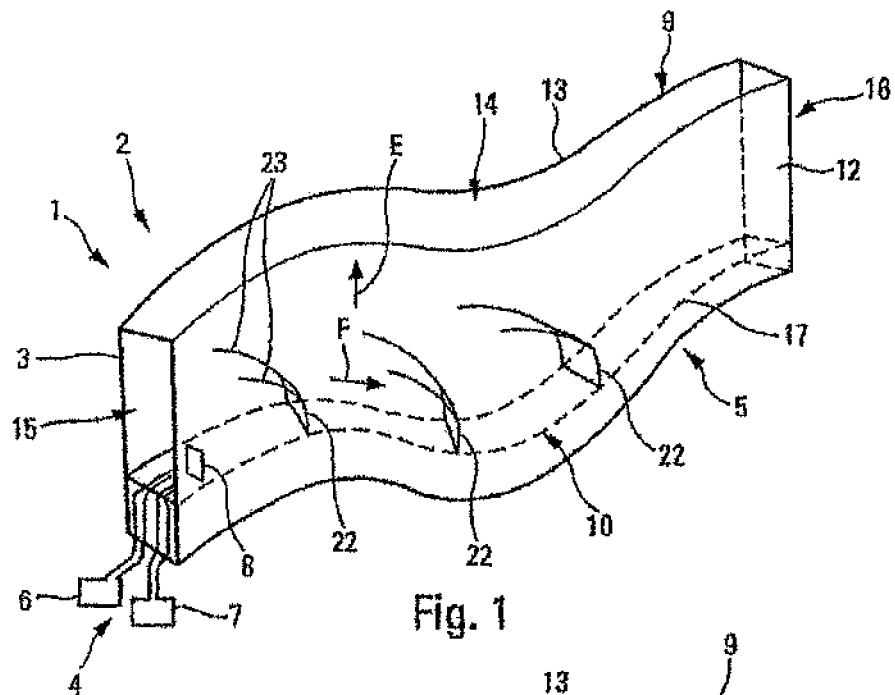
FIGS. 1 and 2 are highly schematic perspective views of a continuous detonation wave engine according to the invention, for two different shapes of detonation chamber, respectively.

The engine 1 according to the invention and schematically shown in FIG. 1 is a continuous detonation wave engine and belongs to a propulsive system 2 intended to be used in the aeronautics and/or space field by being mounted on a flying craft.

In a conventional manner, this continuous detonation wave engine 1 operates with a detonating mixture of fuel and oxidant (particularly air) and comprises, in a conventional manner:
- at least one detonation chamber 3;
- an injection system 4 for continuously injecting the components (fuel, oxidant) of said detonating mixture into said detonation chamber 3 at an upstream end 5. These components can originate from conventional storage means 6 and 7; and
- initiation means 8 that are shown highly schematically. These conventional initiation means 8 (for example, an exploding wire or a pre-detonation tube) are disposed in said detonation chamber 3 so as to initiate in the detonating mixture a detonation wave which is then propagated in said mixture and is the cause of successive self-initiated detonation waves, so as to generate continuous production of hot gases, escaping from the chamber 3 through an open downstream end 9.

It should be noted that, in this description, the notions of upstream and downstream are defined in relation to the general direction of flow E of the gases.

According to the invention, said detonation chamber 3 comprises, at the upstream end 5 (relative to said direction E), at the inlet, a transverse surface referred to as injection base 10. This surface is transverse in relation to the longitudinal direction of the chamber 3, which is generally defined by the general direction of flow E of the gases. This injection base has a length L1 which is defined by an open line so as to form a detonation chamber 3 having an elongate, and not annular, shape in the transverse plane. In terms of the width L2 of the injection base 10, it can be variable, but is preferably constant.

Figure 2:
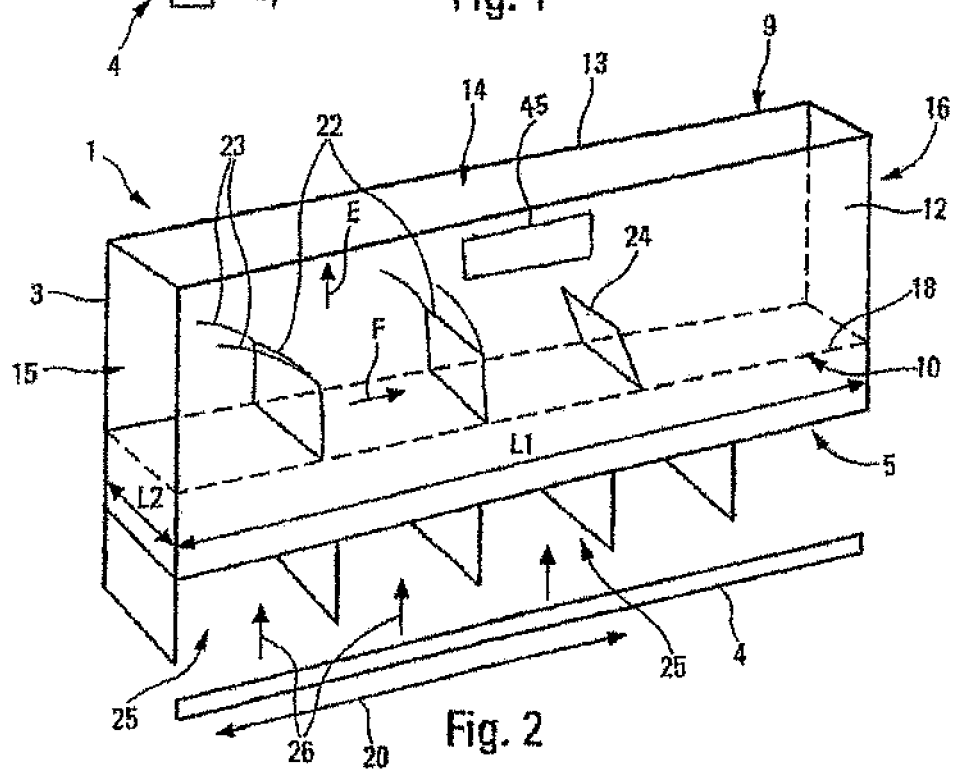

This upstream injection base 10 can have a length of any open shape, particularly straight or curved, but not closed, as opposed to a conventional annular chamber. The chamber 3 further comprises two walls 12 and 13 that are parallel, for example, and that extend longitudinally on either side of this injection base 10. The chamber 3 thus has a three-dimensional geometric shape having faces (flat or non-flat), in particular six faces, that meet at edges. In the examples of FIGS. 1 and 2, the chamber 3 comprises the following faces:
- the injection base 10 at the upstream end 5;
- an open face 14 at the downstream end 9;
- the two walls 12 and 13; and
- two faces 15 and 16 at the two ends of the injection base 10 along the open line.

The chamber 3 can in particular be in the general shape of any type of hexahedron (polyhedron having six flat faces) and in particular that of a parallelepiped (hexahedron having parallel faces in pairs).

In the example of FIG. 1, the length of the injection base 10 is defined by a curved line, as illustrated for example by a line 17.

Furthermore, in the case of a rectangular injection base 10 that is thus defined by a straight line (according to the length L1 of the rectangle, as illustrated by a line 18), the chamber 3 can, for example, assume the shape of a rectangular parallelepiped (all of the faces of which are flat and are rectangles), as shown in FIG. 2.

In this way, the engine 1 according to the invention comprises a detonation chamber 3 that does not have (and is not limited to) an annular shape, but can have multiple other different shapes.

Furthermore, according to the invention, said injection system 4 is disposed so as to inject the fuel/oxidant mixture at at least one portion 20 of said injection base 10, as shown in FIG. 2. This injection system 4 is particularly formed so as to generate (jointly with the wave initiated by the initiation means 8) specific local conditions, which allow the creation of the series of detonation waves (naturally initiated) in the detonation chamber 3. The specific local conditions for creating this series of detonation waves can be defined by a person skilled in the art, particularly in an empirical manner.

The conventional initiation means 8 (for example, an exploding wire or a pre-detonation tube) are disposed in said detonation chamber 3 so as to initiate in the detonating mixture a detonation wave 8 which is then propagated in said mixture in the longitudinal direction (arrow F) of the injection base 10 and is the cause of automatically initiated successive detonation waves 22. This wave is propagated in the fresh detonating mixture along the injection base 10, whereas the hot gases that it produces expand into the rest of the chamber 3 (as shown by the lines 23 illustrating the expansion of the detonation products) and will be evacuated through the open end 9 of the detonation chamber 3. These hot gases which expand toward the open end 9 of the chamber 3 can be used in different ways, particularly by being accelerated by a pipe so as to obtain a thrust.

Beyond the injection zone (or portion) 20, along the injection base 10, the detonation wave degenerates into a single compression wave 24, as shown in FIG. 2. In the example of FIG. 2, various injection zones 25 have been provided, only some of which are supplied (arrows 26).

Within the context of the present invention, the ends 15 and 16 of the detonation chamber 3 can be open or closed independently of each other. Furthermore, the initiation (implemented by the initiation means 8) can be located anywhere along the injection base 10.

By virtue of the multitude of shapes that can be contemplated for the detonation chamber 3, according to the invention, the possible applications of the engine 1 are considerably increased in relation to a conventional engine having an exclusively annular detonation chamber.

Figure 9:
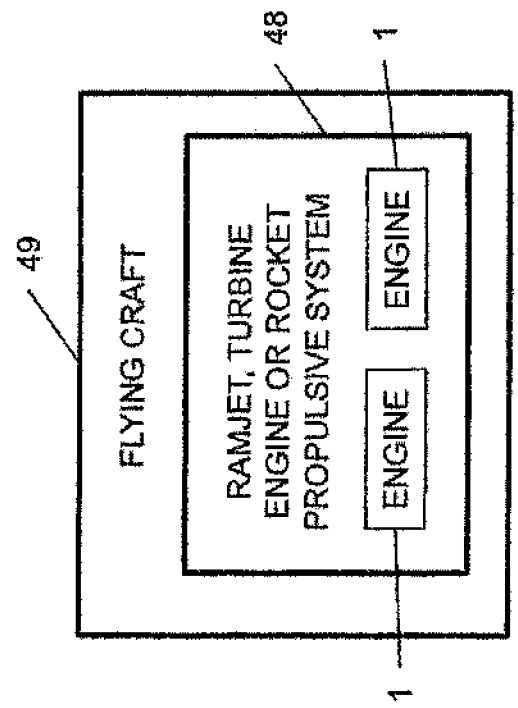
FIG. 9 is a block diagram of a flying craft according to an embodiment.

In this way, numerous applications can be contemplated, in particular for liquid propellant rocket engines, turbine engine systems or even ramjets 48 (FIG. 9).

Furthermore, the injection system 4 injects the conventional fuel separately from the air. The injection of a pre-mixture is thus not intended, which avoids any risk of ignition upstream of the detonation chamber 3. Moreover, in the case of a fuel that can be stored, such as a liquid hydrocarbon, it is also possible to provide a regenerative circuit (not shown) allowing the fuel to be pre-vaporised (before its injection) and thus satisfactory mixing and detonation conditions to be obtained without pre-mixing. Preferably, this regenerative circuit (or cooling circuit 45, FIG. 2), in which fuel circulates, extends along at least one side wall of said detonation chamber 3, over at least a portion of its length.

In one specific embodiment, said injection system 4 is capable of producing the injection over a variable length along said injection base 10. It is thus possible to provide various injection zones 25 along the injection base 10, a variable number of which can be supplied (arrows 26 in FIG. 2). It is thus possible to provide separate injection means for these various injection zones 25.

By virtue of this specific embodiment, it is possible to supply a larger or smaller portion of the detonation chamber 3 with fuel and/or oxidising agent so as to modulate the thrust (for an aerobic system, only a modulation of fuel injection is provided).

Figure 8:
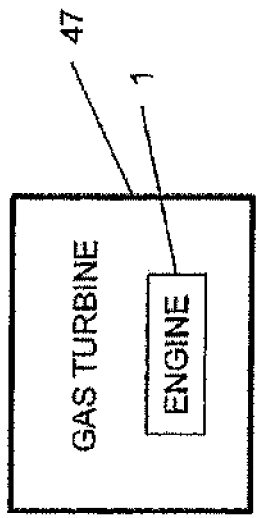
FIG. 8 is a block diagram of a gas turbine according to an embodiment.

FIG. 8 is a schematic block diagram of a gas turbine 47, that is provided with at least one continuous detonation wave engine 1, as previously described. Alternatively, as shown in FIG. 9, if two engines 1 of this type are mounted on a flying craft so as to generate propulsions on either side of an axis of rotation, respectively, a rotation of said flying craft can be generated about this axis by producing an asymmetric injection. By way of illustration, such an engine 1 can be mounted on each of the wings of an aeroplane (not shown), the injection base 10 of the chamber 3 being defined each time along the trailing edge of the corresponding wing, and a yawing moment can be created by carrying out different injections on these two engines 1. It is thus possible to create a possibility of contributing to the control of a flying craft by asymmetric injection modulation, by providing a propulsive system 2 comprising a plurality of engines 1 (with variable feed length).

Figure 3:
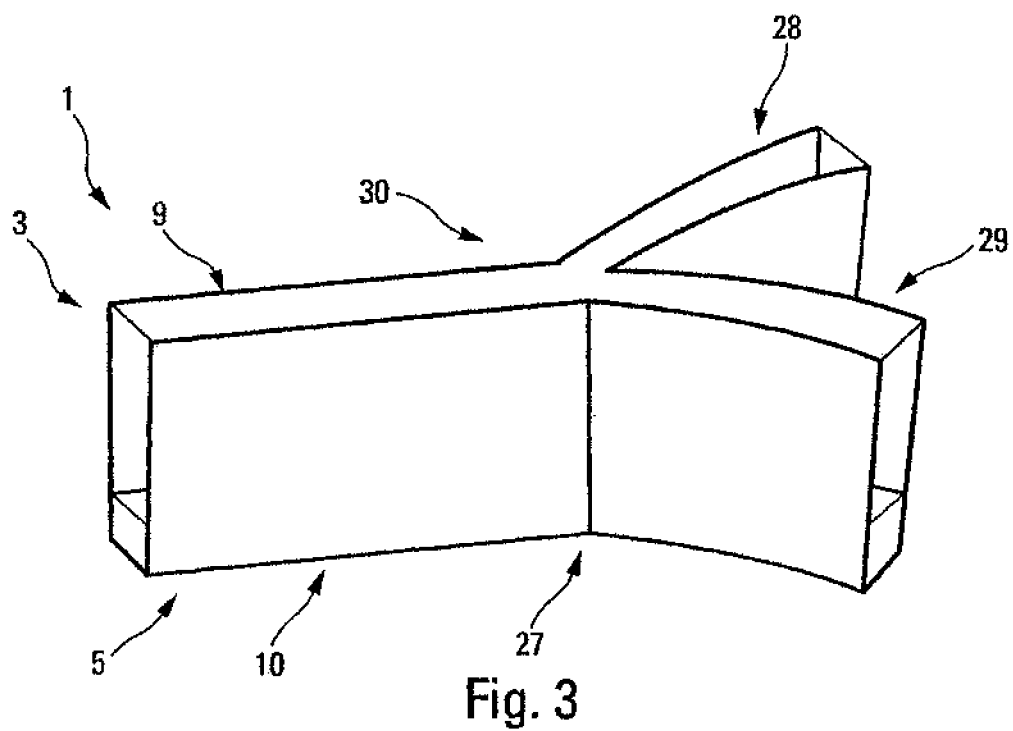
FIG. 3 is a perspective schematic view of a specific embodiment of an engine according to the invention, comprising a bifurcation detonation chamber.
Figure 4:
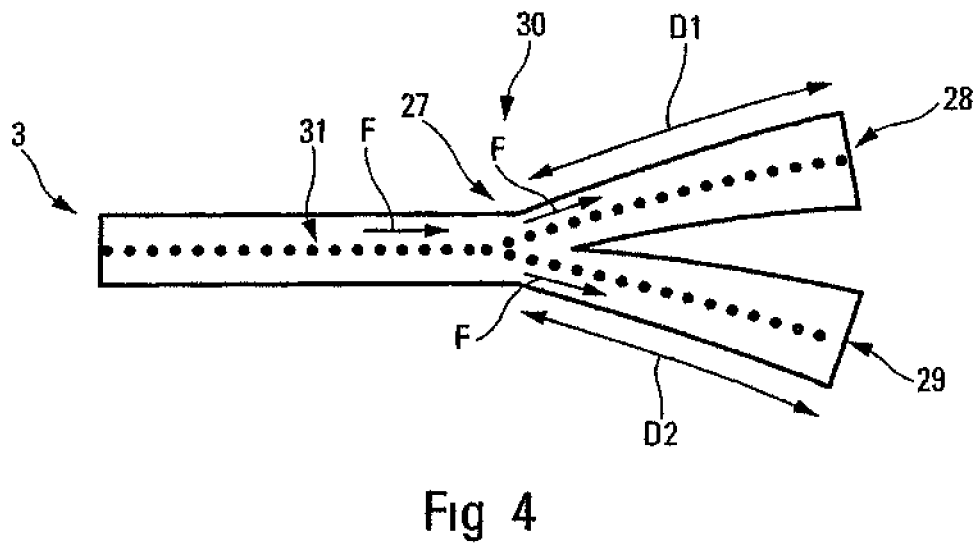
FIG. 4 is a schematic plan view of FIG. 3.

Furthermore, in one specific embodiment, said detonation chamber 3 has a bifurcation 27 at the injection base 10, as shown in FIGS. 3 and 4, so as to create, beyond this bifurcation 27, at least two elongate branches 28 and 29 and to thus form a bifurcation chamber 30. Each of these branches 28 and 29 is supplied with detonating mixture by said injection system 4, as illustrated in FIG. 4 by series 31 of dots representing injection lines. This specific embodiment allows the creation of two (or more) propulsive lines by propagating the waves in the two (or more) branches 28 and 29. Of course, each engine 1 comprises, in addition to a detonation chamber, all of the aforementioned means, in particular the injection system 4 and the initiation means 8 that are necessary for its operation, even if, for the sake of simplifying the drawing, only the chambers have been shown in FIGS. 3 and 4, as well as in FIGS. 5 to 7. In FIGS. 4 to 7, the direction of displacement of the detonation waves 22 has been shown by means of arrows F.

In the case of a bifurcation chamber 30, the injection system 4 can supply each of the branches 28 and 29 over a longer or shorter length, as illustrated by the double arrows D1 and D2 in FIG. 4, and thus provide a possibility of realising vector control of the thrust by asymmetrising the injection conditions (thus without steerable pipe) of the flying craft equipped with said engine 1. These branches 28 and 29 can thus be supplied over lengths which can vary over time and independently of each other.

Figure 5:
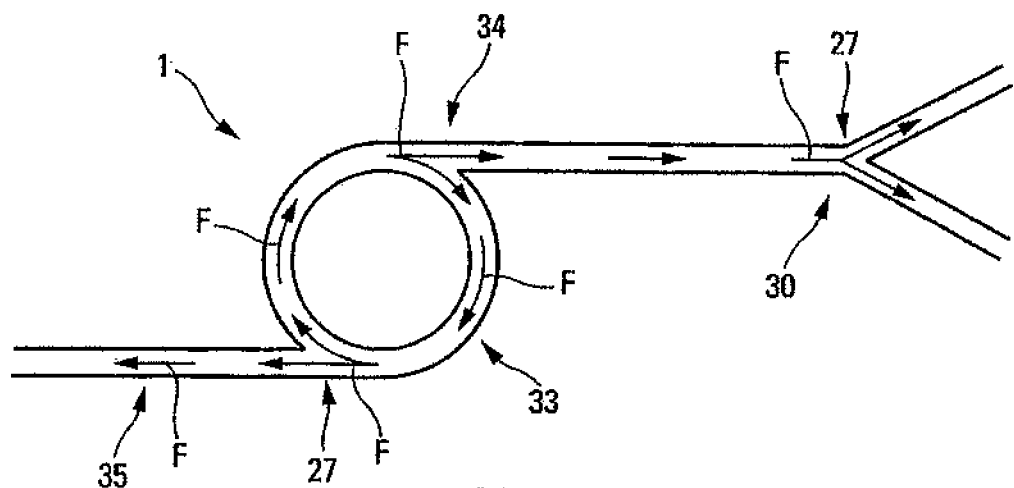
FIG. 5 is a schematic view of a specific embodiment of an engine according to the invention, comprising a hybrid chamber.

Furthermore, in one specific embodiment, shown in FIG. 5, said engine 1 can comprise, in addition to a bifurcation chamber 30, an annular detonation chamber 33 of the conventional type. Moreover, said bifurcation chamber 30 is connected to said annular chamber 33 (by a longer or shorter link) so as to obtain a hybrid chamber 34. This specific embodiment thus combines the advantages of an annular chamber (ensured operating stability) and those of a bifurcation chamber:

optimal operation over a wide range of conditions (thrust/richness): a larger or smaller portion of the length of the chamber is supplied and the rest is only supplied by the oxidising agent (air, a priori);

limitation of the start-up shock: only the annular chamber that is disposed upstream is started; and distributed propulsion (and distributed control).

Furthermore, said annular chamber 33 of this hybrid chamber 34 can also be connected, via one or more bifurcations 27, to one or more additional extensions 35 (or branches).

Figures 6, 7:
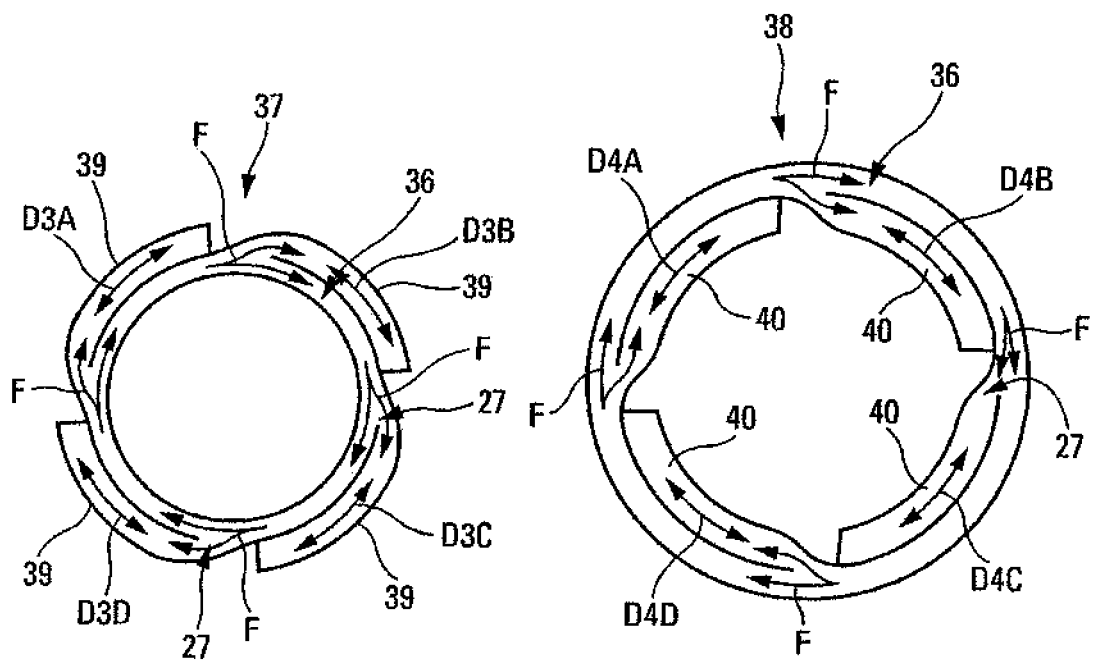
FIGS. 6 and 7 are schematic views of embodiments of an engine having a hybrid chamber, comprising internal and external extensions, respectively.

Moreover, in one specific embodiment, shown in FIGS. 6 and 7, a hybrid chamber 37, 38 can be provided that is in the form of an annular detonation chamber 36 provided (via bifurcations 27) with extensions 39, 40. These extensions 39, 40 are concentric in relation to the annular chamber 36. Preferably, these extensions 39, 40, of which there are four, for example, are evenly distributed over the (internal or external) periphery of the annular chamber 36 and can have variable feed lengths, as shown by arrows D3A to D3B and D4A to D4B. In one specific embodiment, in order to obtain a variation in the length of the fuel supply, it is possible, for example, to provide a disc that rotates between the fuel supply system 4 and the detonation chamber 3 and which exposes, to a greater or lesser extent, oblong openings provided in a fuel header.

In the specific variant in FIG. 6, the concentric extensions 39 are disposed radially outside said annular detonation chamber 36, whereas, in the variant in FIG. 7, the concentric extensions 40 are disposed radially inside said annular detonation chamber 36.

It is then easy to continuously modulate the thrust by supplying a longer or shorter length (D3A to D3B and D4A to D4B) of these extensions 39, 40 with fuel (or with fuel and oxidising agent for a rocket system). Similarly, it is possible to easily control the orientation of the thrust (for a ramjet or a rocket).

Such a hybrid chamber 37, 38 can in particular be used to replace a single annular chamber or concentric annular chambers in a ramjet, a turbine engine or a rocket engine

The invention claimed is:
1. Continuous detonation wave engine operating with a detonating fuel/oxidant mixture and comprising:
   at least one detonation chamber (3);
   a plurality of injection lines (31) for injecting the detonating fuel/oxidant mixture into said detonation chamber at an upstream end (5), said detonation chamber (3) comprising an injection base (10) at said upstream end, and two walls (12, 13) which extend on either side of this injection base to a downstream end comprising an open face; and initiation means (8) which are disposed in said detonation chamber (3), to initiate in the detonating fuel/oxidant mixture a detonation wave (22) which is then propagated in said detonating fuel/oxidant mixture and is the cause of successive self-initiated detonation waves, so as to generate production of hot gases, escaping through the open face of the downstream end (9) of said detonation chamber (3), wherein said detonation chamber (3) comprises said injection base (10), so as to form said detonation chamber (3) having an elongate form in a transverse plane, and in that said injection lines are arranged along a propagation direction (F) of the detonation wave (22) so as to inject the detonating fuel/oxidant mixture into said detonation chamber (3) at a plurality of portions (20) of said injection base (10), the plurality of portions (20) arranged along the propagation direction (F);

wherein said detonation chamber has a bifurcation (27) at the injection base (10), allowing at least two elongate branches (28, 29) to be created beyond said bifurcation, wherein each of the at least two elongate branches are configured to receive a detonating mixture supplied by an injection system (4).

2. Engine according to claim 1, wherein said injection base (10) is defined by an open curved line (17).

3. Engine according to claim 1, wherein said injection base (10) has a rectangular shape and the detonation chamber has a rectangular parallelepiped shape.

4. Engine according to claim 1, wherein said injection lines are capable of producing the injection over a variable length.

5. Engine according to claim 1, wherein said engine comprises at least one cooling circuit for said detonation chamber, in which cooling circuit fuel can circulate before being injected into said detonation chamber.

6. Engine according to claim 5, wherein said cooling circuit extends along at least one side wall of said detonation chamber, over at least a portion of a length of said detonation chamber.

7. Engine according to claim 1, wherein each of the at least two elongate branches (28, 29) are configured to receive the detonating mixture over different lengths or time, independently of one another.

8. Engine according to claim 1, wherein said engine further comprises an annular detonation chamber (33, 36) and in that said detonation chamber is connected to said annular detonation chamber (33, 36) so as to form a hybrid chamber (34, 37, 38).

9. Engine according to claim 8, wherein said hybrid chamber (37, 38) takes the form of said annular detonation chamber (36) provided with concentric extensions (39, 40) of variable feed lengths.

10. Engine according to claim 9, wherein said concentric extensions (39) are disposed outside said annular detonation chamber (36).

11. Engine according to claim 9, wherein said concentric extensions (40) are disposed inside said annular detonation chamber (36).

12. Energy generation system, in particular a gas turbine, wherein said gas turbine is provided with at least one engine (1) as specified in claim 1.

13. Propulsive system for flying craft, in particular of the ramjet, turbine engine or rocket type, wherein said propulsive system is provided with at least one engine (1) as specified in claim 1.

14. Propulsive system according to claim 13, wherein said propulsive system is provided with at least two engines (1), each of which comprises injection lines capable of modulating the injection.

15. Flying craft, wherein said propulsive system is provided with at least one propulsive system (2) such as that specified in claim 14.

16. Continuous detonation wave engine operating with a detonating fuel/oxidant mixture and comprising:

at least one detonation chamber (3);

a plurality of injection lines (31) for injecting the detonating fuel/oxidant mixture into said detonation chamber at an upstream end (5), said detonation chamber (3) comprising an injection base (10) at said upstream end, and two walls (12, 13) which extend on either side of this injection base; and initiation means (8) which are disposed in said detonation chamber (3), to initiate in the detonating fuel/oxidant mixture a detonation wave (22) which is then propagated in said detonating fuel/oxidant mixture and is the cause of successive self-initiated detonation waves, so as to generate production of hot gases, escaping through a downstream end (9) of said detonation chamber (3), wherein said detonation chamber (3) comprises said injection base (10), so as to form said detonation chamber (3) having an elongate form in a transverse plane, and in that said injection lines are arranged along a propagation direction (F) of the detonation wave (22) so as to inject the detonating fuel/oxidant mixture into said detonation chamber (3) at a plurality of portions (20) of said injection base (10), the plurality of portions (20) arranged along the propagation direction (F);

wherein said engine further comprises an annular detonation chamber (33, 36) and in that said detonation chamber is connected to said annular detonation chamber (33, 36) so as to form a hybrid chamber (34, 37, 38).

17. Continuous detonation wave engine according to claim 16, wherein said injection base (10) is defined by an open curved line (17).

18. Continuous detonation wave engine according to claim 16, wherein said injection base (10) has a rectangular shape and the detonation chamber has a rectangular parallelepiped shape.

19. Continuous detonation wave engine according to claim 16, wherein said engine comprises at least one cooling circuit for said detonation chamber, in which cooling circuit fuel can circulate before being injected into said detonation chamber.

20. Continuous detonation wave engine according to claim 19, wherein said cooling circuit extends along at least one side wall of said detonation chamber, over at least a portion of a length of said detonation chamber.

* * * * *